(12) United States Patent
Wada

(10) Patent No.: US 12,247,647 B2
(45) Date of Patent: Mar. 11, 2025

(54) TABLE DEVICE

(71) Applicant: NSK LTD., Tokyo (JP)

(72) Inventor: Kenichiro Wada, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/284,167

(22) PCT Filed: Mar. 4, 2022

(86) PCT No.: PCT/JP2022/009330
§ 371 (c)(1),
(2) Date: Sep. 26, 2023

(87) PCT Pub. No.: WO2022/209575
PCT Pub. Date: Oct. 6, 2022

(65) Prior Publication Data
US 2024/0167546 A1     May 23, 2024

(30) Foreign Application Priority Data
Mar. 31, 2021   (JP) .................................. 2021-062145

(51) Int. Cl.
*F16H 25/22*     (2006.01)
*F16H 25/20*     (2006.01)

(52) U.S. Cl.
CPC ..... *F16H 25/2204* (2013.01); *F16H 25/2015* (2013.01); *F16H 2025/204* (2013.01); *F16H 2025/2075* (2013.01)

(58) Field of Classification Search
CPC ........... F16H 2025/204; F16H 25/2204; F16H 2025/2034; F16H 2025/2031
See application file for complete search history.

(56) References Cited

U.S. PATENT DOCUMENTS 6,142,030 A * 11/2000 Nagai .................... B23Q 37/00
                                                                74/89.32
7,878,082 B2    2/2011  Yamagishi

FOREIGN PATENT DOCUMENTS

| JP | 61-025742 A    | 2/1986   |
|----|----------------|----------|
| JP | 2002106671 A * | 4/2002   |
| JP | 2005-325880 A  | 11/2005  |
| JP | 2009-127751 A  | 6/2009   |
| JP | 2016-196364 A  | 11/2016  |

OTHER PUBLICATIONS

International Search Report for PCT/JP2022/009330, dated May 17, 2022.

* cited by examiner

*Primary Examiner* — Gregory Robert Weber
(74) *Attorney, Agent, or Firm* — Sughrue Mion, PLLC

(57) ABSTRACT

A table device includes a ball screw including a male screw member extending in an axial direction and a female screw member meshing with the male screw member and movable in the axial direction according to rotation of the male screw member, a slide device that movably supports the female screw member, and a fixing member to which the slide device is fixed. The fixing member includes a first wall section extending in a first direction and a second wall section extending in a second direction crossing the first direction in a cross section including an axis of the male screw member.

7 Claims, 4 Drawing Sheets

TABLE DEVICE

CROSS REFERENCE TO RELATED APPLICATIONS

This application is a National Stage of Application No. PCT/JP2022/009330 filed Mar. 4, 2022, claiming priority based on Japanese Patent Application No. 2021-062145 filed Mar. 31, 2021.

FIELD

The present disclosure relates to a table device.

BACKGROUND

In a measuring device, a machine tool, and the like, a table device (a slide device) including a ball screw and a slide table is known. Patent Literature 1 discloses a table device (a slide device) including, in a cross section orthogonal to a screw shaft of a ball screw, a substantially U-shaped track rail and a slider slidably supported in the track rail.

CITATION LIST

Patent Literature

Patent Literature 1: JP 2005-325880 A

SUMMARY

Technical Problem

Since the track rail disclosed in Patent Literature 1 is substantially U-shaped in a cross section, the entire table device (slide device) is likely to increase in size.

An object of the present disclosure is to provide a table device in which the size of the entire device is further reduced.

Solution to Problem

To achieve the above object, a table device according to an embodiment of the present disclosure comprising: a ball screw including a male screw member extending in an axial direction and a female screw member meshing with the male screw member and movable in the axial direction according to rotation of the male screw member; a slide device that movably supports the female screw member; and a fixing member in which the slide device is provided, wherein the fixing member includes a first wall section extending in a first direction and a second wall section extending in a second direction crossing the first direction in a cross section including an axis of the male screw member.

As explained above, the fixing member includes the first wall section extending in the first direction and the second wall section extending in the second direction. Here, since the slide device disclosed in Patent Literature 1 includes the substantially U-shaped track rail in the cross section orthogonal to the screw shaft of the ball screw, the entire device is likely to increase in size. However, since the fixing member of the present aspect has a shape including the first wall section and the second wall section, the fixing member has an advantage that the entire device is smaller than the slide device disclosed in Patent Literature 1.

As a desirable embodiment of the table device, the first wall section has a first surface and a second surface located on an opposite side of the first surface, the second wall section has a third surface and a fourth surface located on an opposite side of the third surface, in the cross section including the axis of the male screw member, the first surface and the third surface are disposed to face each other across a half line extending, starting from a crossing section where the first wall section and the second wall section cross, in a third direction crossing the first direction and the second direction, a support member that rotatably supports the male screw member is provided on the first surface side, and the slide device is provided on the fourth surface side.

As explained above, the support member of the male screw member is fixed to the first surface of the first wall section and the slide device is provided on the fourth surface of the second wall section. Therefore, by dispersing the constituent components of the table device to the first wall section and the second wall section and fixing the constituent components, the table device is reduced in size as the entire device.

As a desirable embodiment of the table device, further comprising a drive source that rotationally drives the male screw member, wherein the slide device includes a plate-like member extending in the axial direction, the female screw member being fixed to the plate-like member, a linear guide extending in the axial direction and fixed to the second wall section, and a slider fixed to the plate-like member and slidably supported by the linear guide, and a fixing position to the female screw member in the plate-like member is a position further separated from the drive source than a center in the axial direction of the plate-like member.

Consequently, when the female screw member moves to the drive source side, the drive source and the female screw member are prevented from interfering. Therefore, the position of the end portion on the drive source side of the plate-like member is disposed further on the drive source side in the present aspect than in Patent Literature 1. Therefore, in the present aspect, a sliding range along the axial direction of the plate-like member is larger.

As a desirable embodiment of the table device, the drive source is fixed to the fixing member, and an end portion in the axial direction of the drive source, an end portion in the axial direction of the fixing member, and an end portion in the axial direction of the linear guide are located side by side in the first direction.

As explained above, since the drive source is fixed to the fixing member, vibration, operation sound, and the like at the time when the drive source operates are suppressed. Since the end portions in the axial direction of the drive source, the fixing member, and the linear guide are located side by side in the first direction, a moving distance of the slide device in the axial direction is longer than that in Patent Literature 1.

As a desirable embodiment of the table device, in the cross section including the axis of the male screw member, the axis of the male screw member is disposed in a region surrounded by the first surface, the third surface, a first straight line passing through a first end most separated from a crossing section with the second wall section in the first wall section and extending along the third surface, and a second straight line passing through a second end most separated from the crossing section in the second wall section and extending along the first surface.

Consequently, since the male screw member and the female screw member are disposed close to the fixing member, the table device is further reduced in size as a whole.

As a desirable embodiment of the table device, further comprising an installation member extending to cross the axial direction, the fixing member being installed in the installation member, wherein the ball screw, the slide device, and the fixing member are disposed in a region surrounded by an outer peripheral edge of the installation member when viewed from the axial direction.

Consequently, the size of the entire table device as viewed from the axial direction is further reduced.

Advantageous Effects of Invention

According to the present disclosure, it is possible to provide a table device in which the size of the entire device is further reduced.

DESCRIPTION OF EMBODIMENTS

An embodiment according to the present invention is explained below with reference to the drawings. However, the present invention is not limited to the embodiment. The requirements of the embodiments explained below can be combined as appropriate. In addition, a part of components is sometimes not used. In the following explanation, an XYZ orthogonal coordinate system is set and a positional relationship among sections is explained with reference to the XYZ orthogonal coordinate system. In the present embodiment, an XY plane is parallel to the horizontal plane. The Z direction is the vertical direction. However, the X direction, the Y direction, and the Z direction are only examples and the present invention is not limited to these directions.

Figure 1:
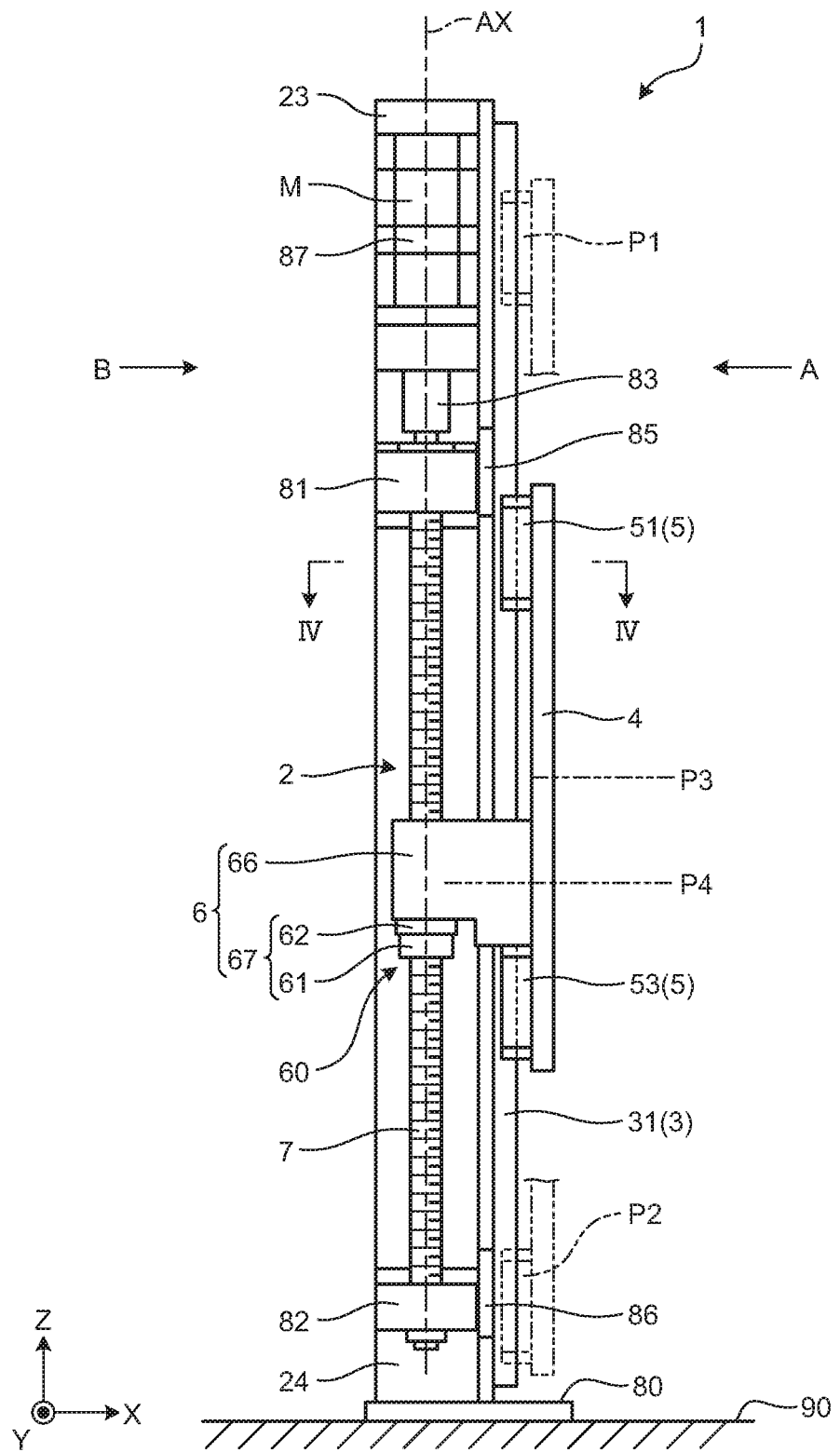
FIG. 1 is a front view illustrating an example of a table device according to an embodiment.
Figure 2:
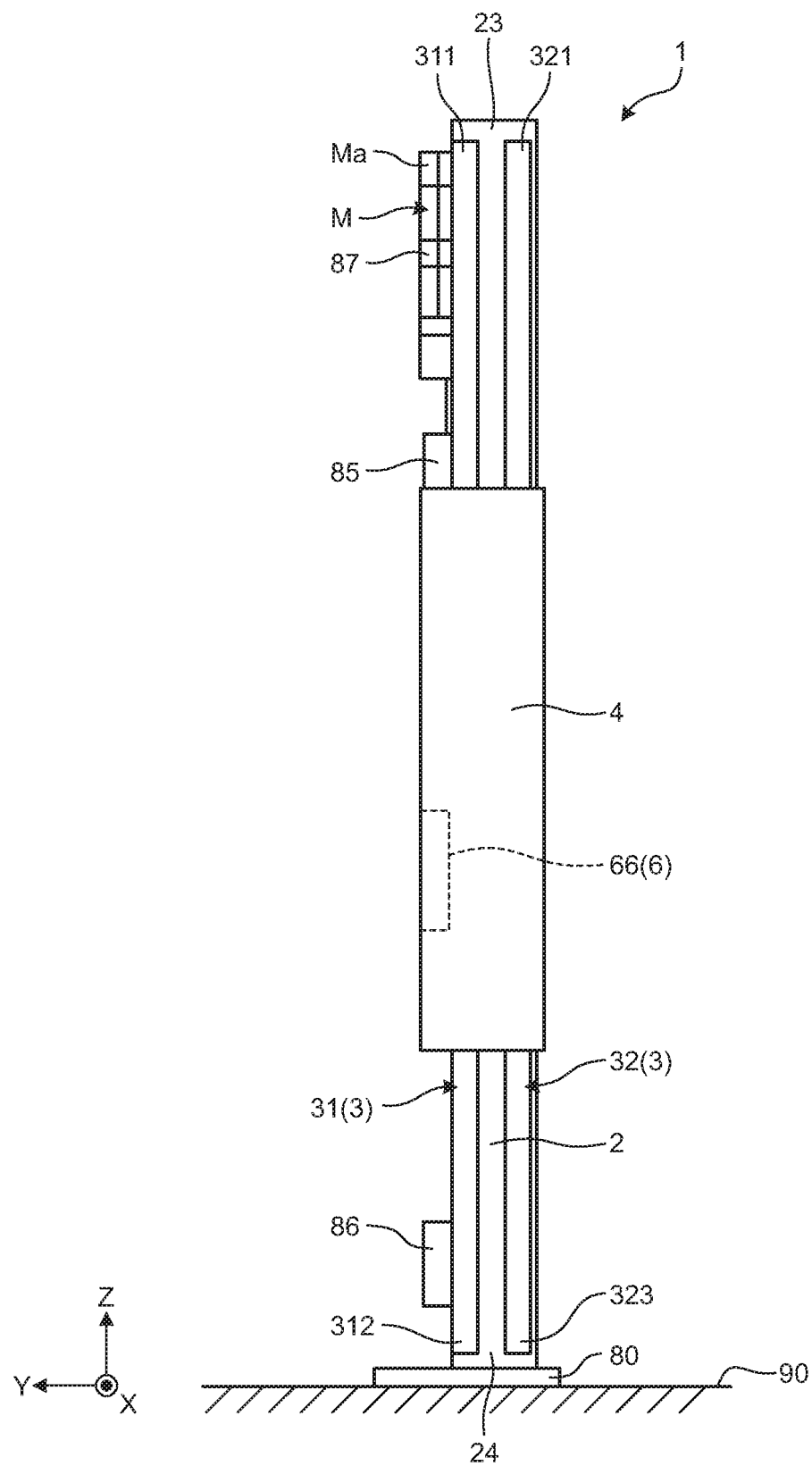
FIG. 2 is a side view illustrating the example of the table device according the embodiment.
Figure 3:
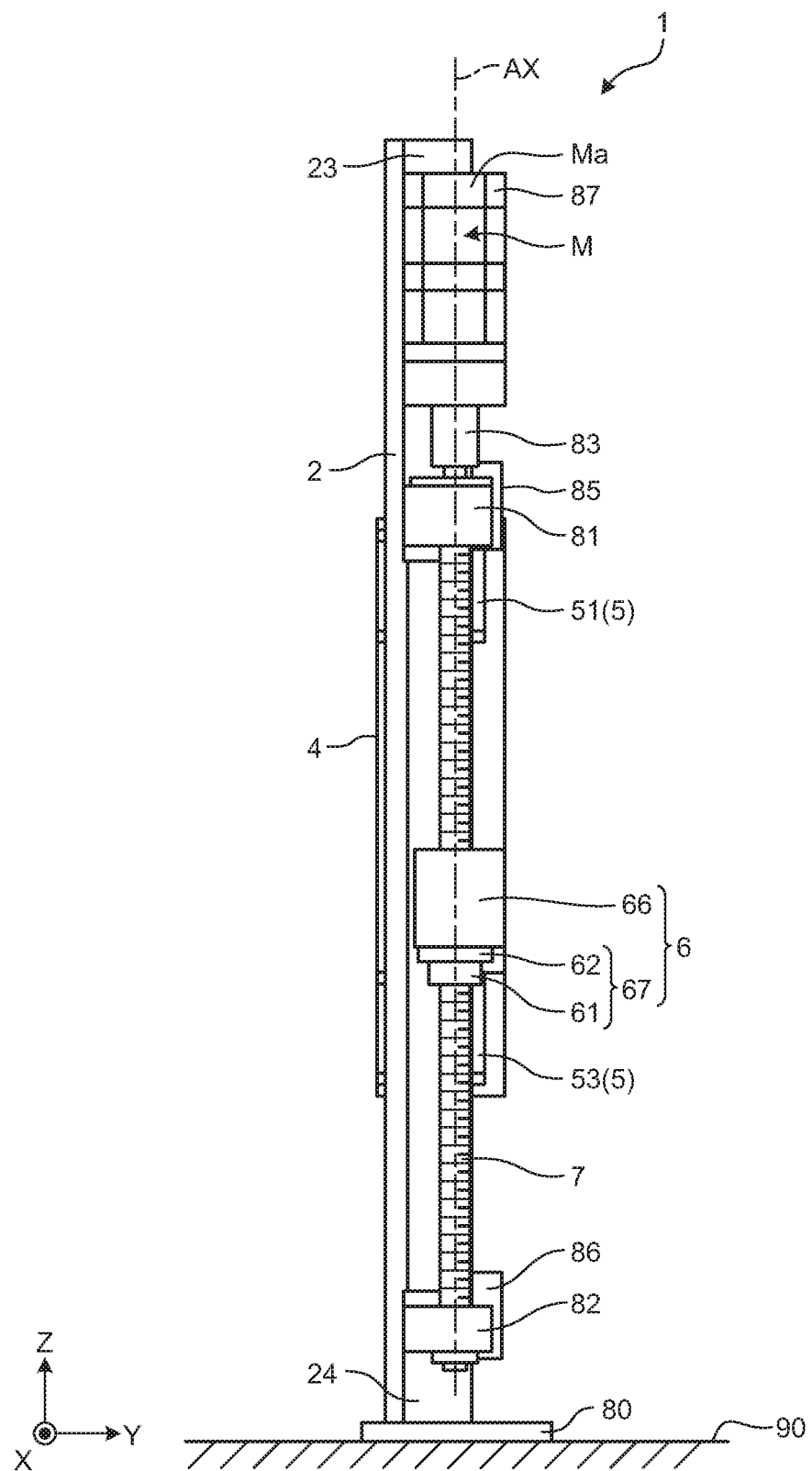
FIG. 3 is a side view illustrating the example of the table device according to the embodiment.
Figure 4:
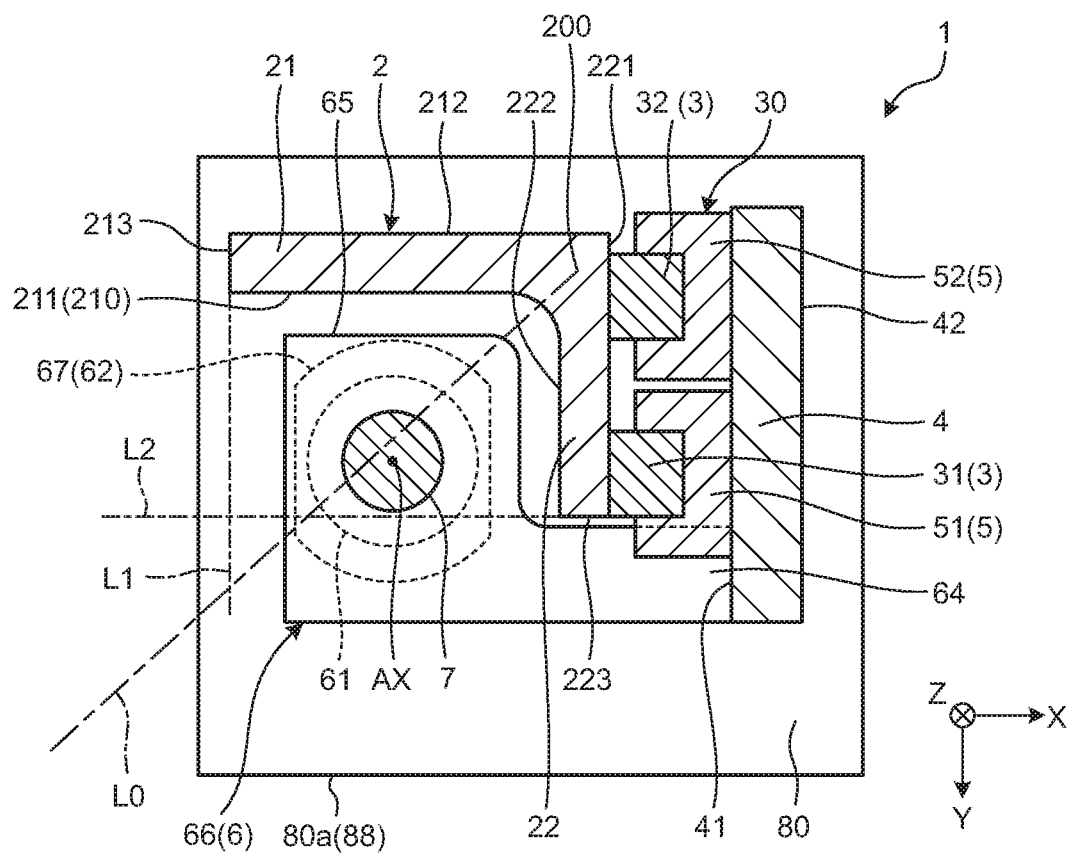
FIG. 4 is a sectional view taken along line IV-IV of FIG. 1.
Figure 5:
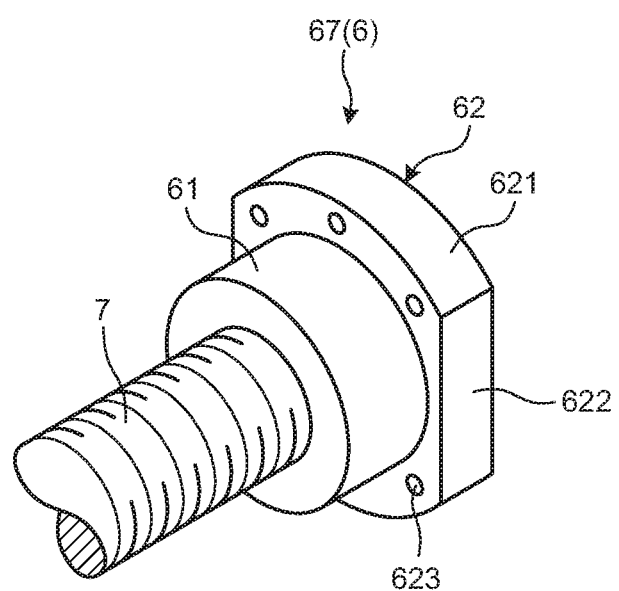
FIG. 5 is a perspective view illustrating a ball nut and a part of a screw shaft.

FIG. 1 is a front view illustrating an example of a table device according to the embodiment. FIG. 2 is a side view illustrating the example of the table device according to the embodiment. FIG. 3 is a side view illustrating the example of the table device according to the embodiment. FIG. 4 is a sectional view taken along line IV-IV in FIG. 1. FIG. 5 is a perspective view illustrating a ball nut and a part of a screw shaft.

As illustrated in FIG. 1, FIG. 2, FIG. 3, and FIG. 4, a table device 1 includes a ball screw 60, a slide device 30, a fixing member 2, a motor M (a drive source), and an installation member 80.

The ball screw 60 includes a screw shaft 7 (a male screw member) and a nut bracket 6 (a female screw member).

As illustrated in FIG. 1 and FIG. 3, the screw shaft 7 (the male screw member) extends from the motor M in a −Z direction (an axial direction). A male screw is provided on the outer circumferential surface of the screw shaft 7. One end (an end portion in a +Z direction) of the screw shaft 7 in the axial direction is fixed to the fixing member 2 via a first support member 81 (a support member). The other end (an end portion in the −Z direction) in the axial direction of the screw shaft 7 is fixed to an attachment section (not illustrated) of the fixing member 2 via a second support member 82 (a support member). The first support member 81 and the second support member 82 support the screw shaft 7 on the fixing member 2 in a rotatable state.

The nut bracket 6 (the female screw member) includes a ball nut 67 and a bracket main body 66. As illustrated in FIG. 5, the ball nut 67 includes a cylindrical section 61 and a flange section 62. A female screw meshing with the male screw of the screw shaft 7 is provided on the inner circumference of the cylindrical section 61. The flange section 62 expands in the radial direction of the screw shaft 7 from the axial direction end portion of the cylindrical section 61. The flange section 62 includes an arcuate section 621 having an arcuate outer peripheral edge centering on an axis AX and a chamfered section 622 having an outer peripheral edge obtained by cutting off the outer circumferential end portion of the arcuate section 621. A pair of arcuate sections 621 is provided across the axis AX. A pair of chamfered sections 622 is provided across the axis AX. The arcuate sections 621 and the chamfered sections 622 are alternately disposed along the circumferential direction. In the flange section 62, a plurality of through-holes 623 piercing in the plate thickness direction (the axial direction) are provided in the circumferential direction.

As illustrated in FIG. 4, the bracket main body 66 includes a first protrusion 64 protruding in a +X direction and a second protrusion 65 protruding in a −Y direction when viewed in the +Z direction (the axial direction). That is, the bracket main body 66 is formed in an L shape by the first protrusion 64 and the second protrusion 65 when viewed from the axial direction. Bolts are inserted into the through-holes 623 provided in the flange section 62 of the ball nut 67 explained above. The flange section 62 is fastened to the bracket main body 66 via the bolts. Since the cylindrical section 61 includes a female screw that meshes with the male screw of the screw shaft 7, the ball nut 67 is movable in the axial direction according to rotation of the screw shaft 7.

The slide device 30 includes a plate-like member 4, a linear guide 3, and a slider 5.

The plate-like member 4 extends along a YZ plane. More specifically, as illustrated in FIG. 2, the plate-like member 4 is a rectangular plate material extending in the +Z direction. As illustrated in FIG. 4, an end portion in a +Y direction of the plate-like member 4 is fixed to the distal end of the first protrusion 64. In a cross section orthogonal to the axis AX, the plate-like member 4 has an inner surface 41 on a −X direction side and an outer surface 42 on a +X direction side. A first slider 51 and a second slider 52 are fixed to the inner surface 41. For example, a machining target object or the like is mounted on the outer surface 42.

As illustrated in FIG. 1, FIG. 3, and FIG. 4, the first slider 51 and the second slider 52 are fixed to the end portion in a +Z direction of the plate-like member 4. A third slider 53 and a fourth slider are fixed to the end portion in a −Z direction in the plate-like member 4. As illustrated in FIG. 2, the linear guide 3 includes a first linear guide 31 and a second linear guide 32 extending in the +Z direction. The first linear guide 31 and the second linear guide 32 are disposed to be separated from each other and extend in parallel to each other. The first linear guide 31 extends from one end portion 311 in the +Z direction to an end portion 312 in the −Z direction. The second linear guide 32 extends from one end portion 321 in the +Z direction to an end portion 323 in the −Z direction. The first linear guide 31 is located further on the +Y direction side than the second linear guide 32.

As illustrated in FIG. 4, the slider 5 has a substantially U shape in the cross section orthogonal to the axis AX. In other words, the slider 5 has a substantially U shape opened in the −X direction. The first linear guide 31 and the second linear guide 32 respectively have rectangular shapes in a cross section orthogonal to the axis AX. The first linear guide 31 is inserted into an opening of the first slider 51. Consequently, the first slider 51 is slidably supported by the first linear guide 31. The second linear guide 32 is inserted into an opening of the second slider 52. Consequently, the second slider 52 is slidably supported by the second linear guide 32.

As illustrated in FIG. 1, FIG. 2, and FIG. 3, the fixing member 2 extends in the axial direction from a first end portion 23, which is the end portion in the +Z direction, to a second end portion 24, which is the end portion in the −Z direction. As illustrated in FIG. 4, the fixing member 2 has a first wall section 21 extending in the +X direction (a first direction) and a second wall section 22 extending in the +Y direction (a second direction crossing the first direction) in the cross section orthogonal to the axis AX. Note that, in the fixing member 2, stoppers 85 and 86 that stop the movement of the nut bracket 6 are provided.

Specifically, as illustrated in FIG. 4, a crossing section 200 between the first wall section 21 and the second wall section 22 is provided. The first wall section 21 extends from a first end 213, which is the end on the −X direction side, to the crossing section 200 in the +X direction. The second wall section 22 extends from the crossing section 200, which is the end on the −Y direction side, to a second end 223, which is the end in the +Y direction. In a cross section orthogonal to the axis AX, the first wall section 21 and the second wall section 22 form an L shape. A surface on the +Y direction side in the first wall section 21 is a first surface 211. A surface on the −Y direction side of the first wall section 21 is a second surface 212. The second surface 212 is located on the opposite side of the first surface 211.

The first end 213 is a part most separated from the crossing section 200 in the first wall section 21. A surface on the −X direction side in the second wall section 22 is a third surface 222. A surface on the +Y direction side in the second wall section 22 is a fourth surface 221. The fourth surface 221 is located on the opposite side of the third surface 222. The second end 223 is a part most separated from the crossing section 200 in the second wall section 22. Although not illustrated, on the first surface 211, an attachment section to which the first support member 81 and the second support member 82 are fixed are provided. The first linear guide 31 and the second linear guide 32 are fixed to the fourth surface 221.

As illustrated in FIG. 4, a half line L0 extends, starting from a crossing section, in a third direction crossing the first direction and the second direction. A crossing angle between the half line L0 and the first surface 211 is approximately 45°. A crossing angle between the half line L0 and the third surface 222 is approximately 45°. However, the crossing angle between the half line L0 and the first surface 211 and the crossing angle between the half line L0 and the third surface 222 are not limited to 45°. The first surface 211 and the third surface 222 are disposed to face each other across the half line L0.

As illustrated in FIG. 1, FIG. 2, and FIG. 3, the motor M (the drive source) is fixed near the first end portion 23 in the fixing member 2 via a band 87. The drive shaft of the motor M is coupled to the screw shaft 7 via a coupling 83. Therefore, the screw shaft 7 rotates centering on the axis AX in association with rotation of the drive shaft of the motor M. As illustrated in FIG. 4, a first straight line L1 indicated by an alternate long and two short dashes line passes through the first end 213 and extends along the third surface 222. A second straight line L2 indicated by an alternate long and two short dashes line passes through the second end 223 and extends along the first surface 211. The axis AX of the screw shaft 7 is located on the inside of a rectangular region surrounded by the first straight line L1, the second straight line L2, the third surface 222, and the first surface 211.

As illustrated in FIG. 2, one end portion 311 (an end portion in the axial direction) of the first linear guide 31, one end portion 321 (an end portion in the axial direction) of the second linear guide 32, an end portion Ma (an end portion in the axial direction) in the +Z direction of the motor M, and the first end portion 23 of the fixing member 2 are located side by side in the +X direction and the +Y direction.

As illustrated in FIG. 1, FIG. 2, and FIG. 3, the installation member 80 is fixed to the second end portion 24 of the fixing member 2 and spreads along an XY plane. The installation member 80 is fixed on a floor surface 90. As illustrated in FIG. 4, the installation member 80 is a plate-like member having a rectangular shape. When viewed from the axial direction, the ball screw 60, the slide device 30, and the fixing member 2 are disposed in a rectangular region 88 surrounded by an outer peripheral edge 80a of the installation member 80.

Subsequently, a procedure in which the slide device 30 moves is briefly explained.

First, when the motor M is driven, the screw shaft 7 rotates centering on the axis AX in association with the rotation of the drive shaft of the motor M. The nut bracket 6 (the female screw member) including the ball nut 67 moves in the axial direction according to the rotation of the screw shaft 7. Since the bracket main body 66 of the nut bracket 6 is fixed to the plate-like member 4, the plate-like member 4 and the slider 5 move in the +Z direction and the −Z direction (the axial direction). Since the machining target object or the like is mounted on the plate-like member 4, the machining target object or the like that moves integrally with the plate-like member 4 can be machined. Here, as indicated by an alternate long and two short dashes line in FIG. 1, the plate-like member 4 and the slider 5 are movable in the +Z direction in a range between a first position P1 on the most +Z direction side and a second position P2 on the most −Z direction side.

Note that, as illustrated in FIG. 1, a position in the center in the axial direction of the plate-like member 4 is represented as a third position P3 and a position in the center in the axial direction of the nut bracket 6 is represented as a fourth position P4. The fourth position P4 is disposed further on the −Z direction side (that is, the side away from the motor M) than the third position P3.

As explained above, the table device 1 according to the present embodiment includes the ball screw 60, the slide device 30, and the fixing member 2 to which the slide device 30 is fixed. The fixing member 2 includes the first wall section 21 extending in the first direction (the +X direction) and a second wall section 22 extending in the second direction (the +Y direction) crossing the first direction in a cross section including the axis AX of the screw shaft 7 (the male screw member). Note that, in the present embodiment, the first direction and the second direction are orthogonal to each other. However, the first direction and the second direction only have to cross each other.

As explained above, the fixing member 2 includes the first wall section 21 extending in the first direction (the +X direction) and the second wall section 22 extending in the second direction (the +Y direction). Here, since the slide device disclosed in Patent Literature 1 includes the substantially U-shaped track rail in the cross section orthogonal to the screw shaft of the ball screw, the entire device is likely to increase in size. However, since the fixing member 2 in the present embodiment has the L shape including the first wall section 21 and the second wall section 22, the entire device is smaller and lighter in weight than the slide device disclosed in Patent Literature 1. As illustrated in FIG. 4, since the −X direction side of the nut bracket 6 is opened, workability for maintaining of the nut bracket 6 is improved.

The first surface 211 of the first wall section 21 includes an attachment section to which the first support member 81 and the second support member 82 (the support members) that rotatably support the screw shaft 7 (the male screw member) are fixed. The slide device 30 is provided on the fourth surface 221 of the second wall section 22.

As explained above, the support members of the screw shaft 7 are fixed to the first surface 211 of the first wall section 21. The slide device 30 is provided on the fourth surface 221 of the second wall section 22. Therefore, by dispersing and fixing the components of the table device 1 to the first wall section 21 and the second wall section 22, the entire device is reduced in size.

The slide device 30 includes a plate-like member 4 to which the nut bracket 6 (the female screw member) is fixed, the linear guide 3 fixed to the fourth surface 221, and the slider 5 slidably supported by the linear guide 3. A fixing position (the fourth position P4) to the nut bracket 6 in the plate-like member 4 is a position further separated from the motor M than the center in the axial direction (the third position P3) of the plate-like member 4.

Consequently, when the nut bracket 6 moves in the direction approaching the motor M, the motor M and the nut bracket 6 are prevented from interfering with each other. Therefore, the position of the end portion on the motor M side of the plate-like member 4 at the time when the plate-like member 4 moves is disposed further on the motor M side in the present embodiment than in Patent Literature 1. Therefore, the sliding range along the axial direction of the plate-like member 4 is larger in the present embodiment.

The motor M is fixed to the fixing member 2, and the end portion Ma in the axial direction of the motor M, the first end portion 23 (the end portion in the axial direction) of the fixing member 2, and the one end portion 311 of the first linear guide 31 and the one end portion 321 (the end portion in the axial direction of the linear guide 3) of the second linear guide 32 are located side by side in the first direction.

As explained above, since the motor M is fixed to the fixing member 2, vibration, operation sound, and the like at the time when the motor M is driven are suppressed. Since the end portions in the axial direction of the motor M, the fixing member 2, and the linear guide 3 are located side by side in the first direction, the moving range in the axial direction of the slide device 30 is longer than that in Patent Literature 1.

In the cross section including the axis AX of the screw shaft 7 (the male screw member), the axis AX of the screw shaft 7 is disposed in a region surrounded by the first surface 211, the third surface 222, the first straight line L1 passing through the first end 213 and extending along the third surface 222, and the second straight line L2 passing through the second end 223 and extending along the first surface 211. Consequently, since the screw shaft 7 and the nut bracket 6 are disposed close to the fixing member 2, the table device 1 is further reduced in size as a whole. Note that scattering of lubricating grease applied to the outer circumferential surface of the screw shaft 7 is suppressed by the first wall section 21 and the second wall section 22 of the fixing member 2.

Further, the table device 1 includes the installation member 80 in which the fixing member 2 is installed. The ball screw 60, the slide device 30, and the fixing member 2 are disposed in the region 88 surrounded by the outer peripheral edge 80a of the installation member 80 when viewed in the axial direction. Consequently, the size of the entire table device 1 viewed from the axial direction is further reduced.

Although the embodiment is explained above, the embodiment is not limited by the content explained above. For example, the table device 1 in the embodiment is installed in a posture extending in the +Z direction. However, the table device 1 may be installed on the floor surface 90 in a posture extending in the +X direction or the +Y direction. Further, the table device 1 may be disposed to be hung on a wall surface of a structure.

REFERENCE SIGNS LIST

1 TABLE DEVICE
2 FIXING MEMBER
3 LINEAR GUIDE
4 PLATE-LIKE MEMBER
5 SLIDER
6 NUT BRACKET (FEMALE SCREW MEMBER)
7 SCREW SHAFT (MALE SCREW MEMBER)
21 FIRST WALL SECTION
22 SECOND WALL SECTION
30 SLIDE DEVICE
60 BALL SCREW
80 INSTALLATION MEMBER
81 FIRST SUPPORT MEMBER (SUPPORT MEMBER)
82 SECOND SUPPORT MEMBER (SUPPORT MEMBER)
88 REGION
211 FIRST SURFACE
212 SECOND SURFACE
222 THIRD SURFACE
221 FOURTH SURFACE
213 FIRST END
223 SECOND END
AX AXIS
L1 FIRST STRAIGHT LINE
L2 SECOND STRAIGHT LINE
M MOTOR (DRIVE SOURCE)

The invention claimed is:

1. A table device comprising:
a ball screw including a screw shaft extending in an axial direction and a nut meshing with the screw shaft and movable in the axial direction according to rotation of the screw shaft;
a slide device that movably supports the nut; and
a fixing member in to which the slide device is provided, wherein
the fixing member is an L-shape and includes a first wall section extending in a first direction and a second wall section extending in a second direction crossing the first direction in a cross section perpendicular to an axis of the screw shaft, and
the slide device is fixed to the second wall section, and at least a portion of the slide device at least partially aligns with the first wall along the second direction.

2. The table device according to claim 1, wherein
the first wall section has a first surface and a second surface located on an opposite side of the first surface, the second wall section has a third surface and a fourth surface located on an opposite side of the third surface, in the cross section perpendicular to the axis of the screw shaft, the first surface and the third surface are disposed to face each other and have a half line defined therebetween, starting from a crossing section where the first wall section and the second wall section cross, in a third direction crossing the first direction and the second direction, a support member that rotatably supports the screw shaft is provided on the first surface side, and the slide device is provided on the fourth surface side.

3. The table device according to claim 2, further comprising a drive source that rotationally drives the screw shaft, wherein the slide device includes a plate-like member extending in the axial direction, the nut being fixed to the plate-like member, a linear guide extending in the axial direction and fixed to the second wall section, and a slider fixed to the plate-like member and slidably supported by the linear guide, and a fixing position to the nut in the plate-like member is a position further separated from the drive source than a center in the axial direction of the plate-like member.

4. The table device according to claim 3, wherein the drive source is fixed to the fixing member, and an end portion in the axial direction of the drive source, an end portion in the axial direction of the fixing member, and an end portion in the axial direction of the linear guide are located side by side in the first direction.

5. The table device according to claim 2, wherein in the cross section perpendicular to the axis of the screw shaft, the axis of the screw shaft is disposed in a region surrounded by the first surface, the third surface, a first straight line defined as passing along a surface of a first end of the first wall section most separated from a crossing section between the second wall section and the first wall section, the first straight line extending along a same direction as the third surface, and a second straight line defined as passing along a surface of a second end most separated from the crossing section in the second wall section, the second straight line extending along a same direction as the first surface.

6. The table device according to claim 2, wherein the slide device includes:

a plate-like member extending in the axial direction, the nut being fixed to the plate-like member, a linear guide extending in the axial direction and fixed to the second wall section, and a slider fixed to the plate-like member and slidably supported by the linear guide, wherein the linear guide includes:

a first linear guide fixed to an end portion of the fourth surface on one side in the second direction, and a second linear guide fixed to an end portion of the fourth surface on another side in the second direction, wherein the slider includes:

a first slider slidably supported by the first linear guide, and a second slider slidably supported by the second linear guide, and wherein, in the cross section perpendicular to the axis of the screw shaft, the first linear guide at least partially aligns with the male screw member in the second direction, and the second linear guide at least partially aligns with the first wall portion in the second direction.

7. The table device according to claim 1, further comprising an installation member extending to cross the axial direction, the fixing member being installed in the installation member, wherein the ball screw, the slide device, and the fixing member are disposed in a region surrounded by an outer peripheral edge of the installation member when viewed from the axial direction.

* * * * *